May 3, 1966     I. H. BOTNICK     3,249,190

SPRING CLUTCH WITH ANTI-FRETTING MOLYBDENUM COATED SURFACE

Filed May 11, 1964

INVENTOR.
IRLIN H. BOTNICK
BY
*William V. Ebs*
HIS ATTORNEY

United States Patent Office 3,249,190
Patented May 3, 1966

3,249,190
SPRING CLUTCH WITH ANTI-FRETTING
MOLYBDENUM COATED SURFACE
Irlin H. Botnick, Pepper Pike, Ohio, assignor to Curtiss-Wright Corporation, a corporation of Delaware
Filed May 11, 1964, Ser. No. 366,549
2 Claims. (Cl. 192—81)

My invention relates to spring clutches. More particularly the invention is directed to the means and a method for reducing fretting corrosion in spring clutch mechanisms.

The problem of fretting corrosion is inherent in spring clutch mechanisms. Fretting corrosion occurs on the spring engageable surfaces of driving and driven members, and also on the clutch spring itself. It occurs primarily where end coils of the spring coact with an underlying or overlying surface of a rotatable member of the clutch mechanism. The condition is due to rubbing and vibration of the spring coils against the underlying or overlying surface of the coacting clutch member, and in certain instances to the intermittent gripping of clutch members by the clutch spring as described for example in Patent 3,128,863 of D. R. Tomko, issued April 14, 1964, for Spring Church Mechanisms. Fretting corrosion has been a major stumbling block to the widespread use of spring clutches almost since their inception because of the resulting malfunction and short life of the devices.

Accordingly, it is an object of the invention to eliminate or at least minimize fretting corrosion and its deleterious effects in spring clutch mechanisms.

It is another object of the invention to markedly reduce fretting corrosion in spring clutch mechanisms by means of an especially resistant coating judiciously applied to one or more of the coacting parts of the device.

It is still another object of the invention to provide a method by means of which fretting corrosion can be simply and effectively reduced to a marked extent in spring clutch mechanisms of conventional design.

It is a further object of the invention to provide a solid lubricant impregnated porous molybdenum coating on one or more of the coacting parts in spring clutch mechanisms to reduce fretting corrosion in such devices.

Other objects and advantages of the invention will become apparent during a reading of the specification taken in connection with the accompanying drawing in which.

Figure 1:
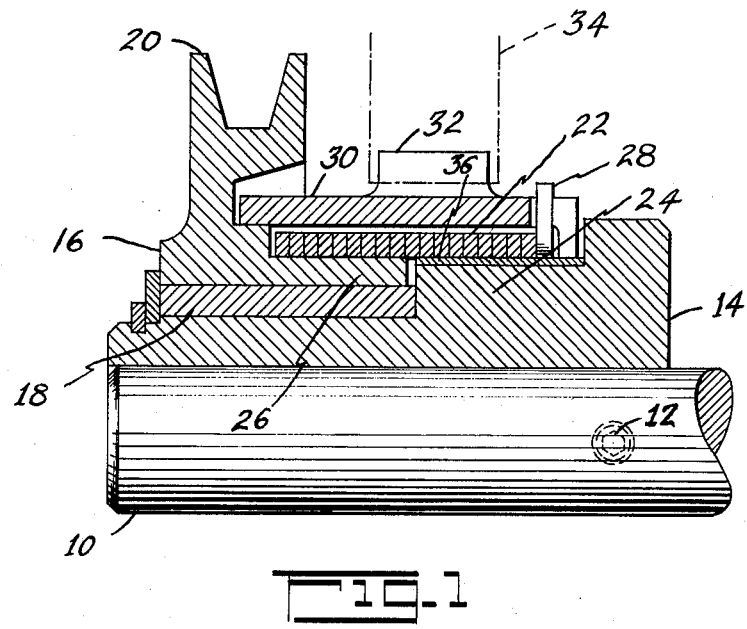
FIGURE 1 is a longitudinal sectional view through one side only of a spring clutch unit of known design, but including an anti-fretting coating according to the invention on the input drum.
Figure 2:
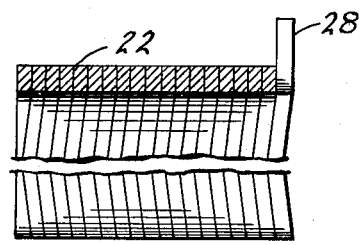
FIGURE 2 is an axial sectional view showing the clutch spring of FIGURE 1.

In FIGURE 1, showing a conventionally designed spring clutch mechanism modified in accordance with the invention, reference character 10 designates a drive shaft permanently connected at 12 to the input drum member 14. The input drum member 14 rotatably supports output drum member 16 of the clutch mechanism on a bearing such as a sleeve or bushing 18. The output drum member may be permanently coupled to a load as through pulley 20 or the drum member may be adapted in any other suitable manner to connect with the load. A helical clutch spring 22 is preloaded against hubs 24 and 26 of input and output drum members 14 and 16 respectively, and has a radial toe 28 at the end of the spring overlying hub 24. The clutch is self-energizing, that is to say, when the input drum member 14 is turned by the drive shaft 10 in the direction in which the spring 22 is wound, the coils of the spring are caused to tightly engage the underlying hub surfaces on the input and output drum members such that the output drum member is caused to rotate with the input hub. If the input drum member 14 is rotated by the drive shaft in a direction opposite to the direction in which the spring is wound the input hub will overrun the spring, the coils of the spring overlying hub 24 of the input drum member 14 being expanded slightly in the process.

The clutch of FIGURE 1 has a control sleeve 30, the function of which is to arrest or release the clutch spring 22. Such control sleeve 30 embraces the hubs 24 and 26 of the drum members 14 and 16, and is attached to the toe 28 of the clutch spring 22. The control sleeve has one or more circumferential abutments such as 32 engageable as by a stop 34 movable into and out of the path of rotation of the abutment or abutments 32. Control sleeve 30 is rotatably supported on the drum members 14 and 16 as shown. During clutch engagement, the control sleeve 30 rotates with the input and output drum members 14 and 16. When rotation of the control sleeve is arrested by stop 34 the spring 22 releases. The input and output drum members disconnect and the output drum member with its connected load coasts to a stop by overrunning the associated coils of the clutch spring. The input drum member continues to rotate while driven by shaft 10 and overruns the overlying coils of the spring.

Experience has shown that in a spring clutch of the described type, fretting corrosion occurs to a marked degree on the cylindrical hub surface of the input drum. It occurs primarily beneath end coils of the spring and is due to the rubbing and vibratory action of spring coils on the hub surface occurring during overrunning of the spring by the input drum member. If the output drum member is connected to drive a load having low inertia, the clutch will tend to chatter during clutch release periods because the spring coils overlying the input drum member will not, in the absence of a special provision to maintain them out of contact with the continuously rotating drum, be prevented from intermittently gripping the hub surface with sufficient force to energize the spring. This results in an aggravated condition of fretting corrosion and premature wear.

Fretting corrosion in spring clutch mechanisms may be largely prevented, in accordance with the invention by coating one or more spring engageable hub surfaces with a layer of molybdenum as shown at 36 on the hub 24 of the input drum 14 of the clutch of FIGURE 1. Tests have shown that exceptional results are obtained with a porous coating, .002 to .004 inch thick, of substantially pure molybdenum which has been impregnated with a solid lubricant. The coating is preferably applied by flame spraying the metal onto the hub 24 while the hub is rotated. The molybdenum coating should be applied to an initial thickness in excess of .004 of an inch and after cooling, without quenching, should be ground down to the final thickness which is preferably between .002 and .004 of an inch. A final thickness much in excess of .004 of an inch is to be avoided because thicker deposits tend to flake during operation of the clutch. After the coating has been ground down to final size the porous molybdenum layer is lubricated with a solid lubricant such as molybdenum disulphide or graphite. The molybdenum layer may be conveniently impregnated with the lubricant as by applying a grease or paste containing the solid lubricating material.

The molybdenum coating may be applied to steel, aluminum and a variety of other metals as well with good results. In any case it is desirable to prepare the surface to which the coating is to be applied as by rough machining and/or grit blasting to assure the attainment of a good bond between the molybdenum coating and the metal to which it is applied.

Although fretting corrosion does not normally occur to as great an extent on the output drum as on the input drum, it may nevertheless present a problem. Fretting corrosion will occur on the output drum of a spring clutch when the inertia of the driven load causes the output drum to overrun the overlying coils of the clutch spring. Accordingly, it may be desirable at least in certain applications to provide a coating of molybdenum as in the manner described on the hub of the output drum as well as on the hub of the input drum.

Spring clutches having the molybdenumized hubs prepared as described are markedly superior in their ability to withstand fretting corrosion to spring clutch mechanisms constructed with any of the materials heretofore considered best suited for resisting such corrosion. Tests show that spring clutches constructed with molybdenumized hubs last several hundred times as long as spring clutch mechanisms having hubs constructed with special wear resistant steels and several thousand times as long as conventional spring clutch constructions on the market.

While the molybdenum coating of the invention has been shown only in the environment of a spring clutch of a particular type, obviously the invention is not limited in its application to the clutch illustrated. The molybdenum coating of the invention may be applied to one or more spring engageable surfaces and/or to the clutch spring in any spring clutch mechanism where the problem of fretting corrosion is created by the rubbing and vibrating action of spring coils against the surface of a driving or driven member, or the intermittent gripping of clutch members by the spring. Other changes and modifications may also be made without departing from the spirit and scope of the invention and it is the intention to cover such changes and modifications by the annexed claims.

I claim:
1. In a spring clutch mechanism, the combination comprising an input member, an output member coaxial with the input member, and a helical spring member radially preloaded against at least one of the first two mentioned members on a cylindrical surface thereof, one of the members in preloaded contact including a substantially pure molybdenum grease retaining porous surface coating which is between .002 and .004 of an inch thick.

2. In a spring clutch mechanism, the combination comprising an input member, an output member coaxial with the input member, and a helical spring member radially preloaded against at least one of the first two mentioned members on a cylindrical surface thereof, one of the members in preloaded contact including a substantially pure molybdenum porous surface coating impregnated with a solid lubricant.

References Cited by the Examiner
UNITED STATES PATENTS

| | | | |
|---|---|---|---|
| 2,994,951 | 8/1961 | Eubank et al. | 29—529 |
| 3,003,588 | 10/1961 | Huntress | 192—107 |
| 3,006,064 | 10/1961 | Watson. | |
| 3,038,563 | 6/1962 | Boegehold | 192—107 |
| 3,128,863 | 4/1964 | Tomko | 192—81 |
| 3,160,952 | 12/1964 | Corney et al. | 29—529 |
| 3,181,669 | 5/1965 | Kunde et al. | 192—81 |

DAVID J. WILLIAMOWSKY, *Primary Examiner.*